Aug. 21, 1928.
A. T. GRIFFITH
RAKE
1,681,336
Filed June 26, 1926
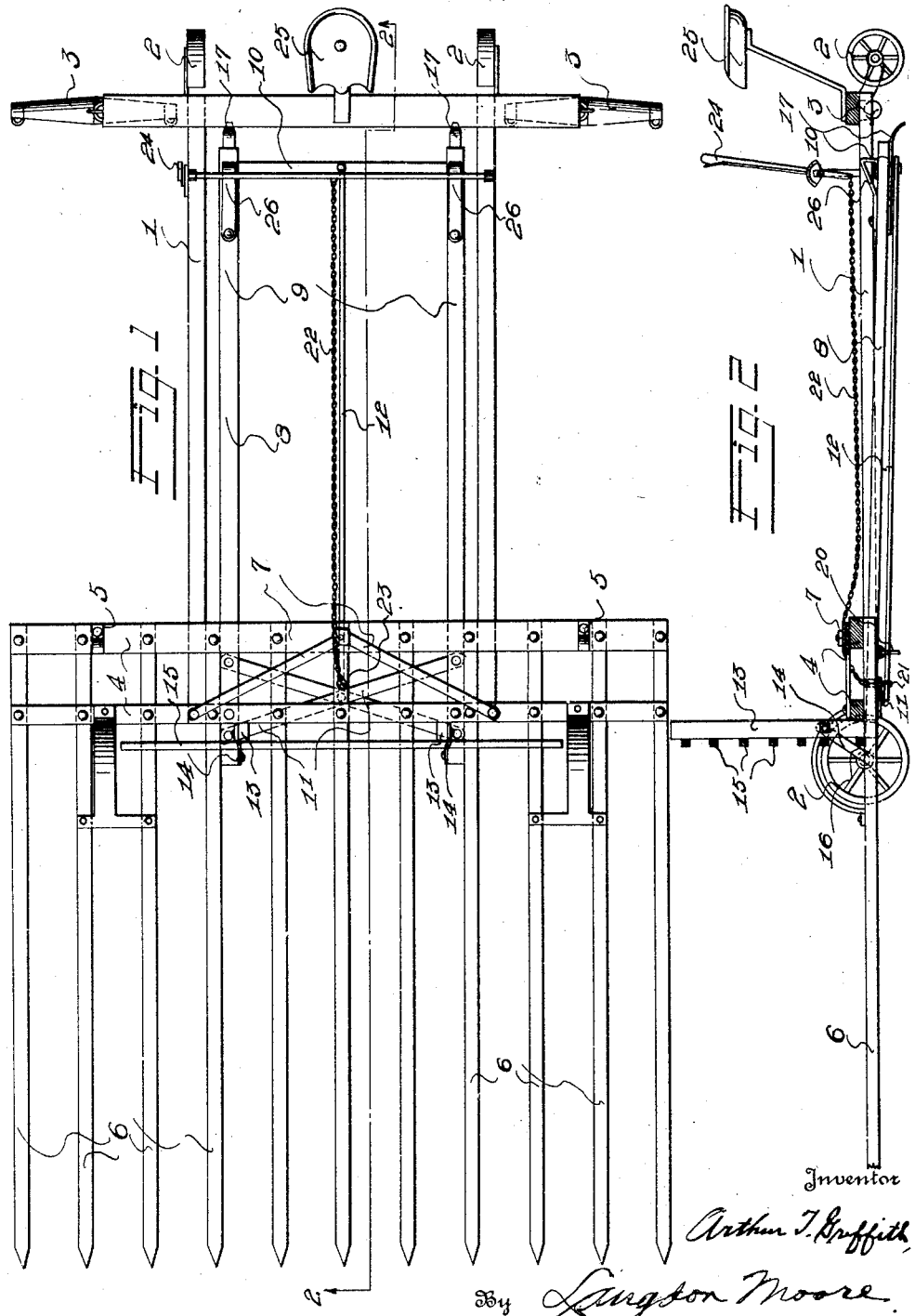
Inventor
Arthur T. Griffith,
By Langston Moore.
Attorney Patented Aug. 21, 1928.

1,681,336

UNITED STATES PATENT OFFICE.

ARTHUR T. GRIFFITH, OF COZAD, NEBRASKA.

RAKE.

Application filed June 26, 1926. Serial No. 118,694.

This invention relates to improvements in what are known as "sweep" rakes for raking hay.

Such rakes are usually employed to rake the windrows and to transfer the hay from the windrows to the stacker and such rakes are usually wheel supported. In some instances, rakes of this character have been provided with ejectors adapted to be actuated when the stacker is reached, for detaching the hay from the rake teeth, when the rake is moved in a reversed direction. It is this type of rake to which the present invention is directed.

The primary object of the invention is to provide an ejector for rakes of this character with means for locking the ejector in its forward position, so that the ejector will not alone clear the hay from the rake teeth, but will also function as a pusher for forcing the ejected hay on to the stacker.

With the foregoing object outlined and with other objects in view, which will appear as the description proceeds, the invention consists in the novel features hereinafter described in detail, illustrated in the accompanying drawing, and more particularly pointed out in the appended claims.

Referring to the drawing,

Fig. 1 is a top plan view of a rake provided with my improvements.

Fig. 2 is a vertical longitudinal sectional view of the same taken on line 2—2 of Fig. 1.

In the drawing, 1 designates a frame carried by front and rear wheels 2. Singletrees 3 are attached to the rear end of the frame, so that the horses may be hitched at opposite sides of the frame.

The front of the frame is provided with cross bars 4, the rear one of which has loops 5 to be connected to the harness of the horses, so that they may back the frame as well as move it forwardly.

These cross bars carry forwardly projecting rake teeth 6, and the bars are braced by rigid straps 7.

This structure is combined with an ejector, designated 8. The ejector comprises side bars 9, connected at their rear ends by a cross bar 10, and at their forward ends by crossed bars 11. A rigid guide rod 12 connects the central portion of the crossed bars 11 to the rear cross bar 10, and is used for the purpose hereinafter mentioned.

Extending upwardly from the front ends of the side bars 9 are vertical posts 13 which are rigidly connected to the side bars 9 and are braced by straps 14. The posts carry transverse rods 15, which together with the posts, form the head of the ejector. A cross rod 16 is rigidly connected to the posts, and rests loosely on the rake teeth, and functions to support the forward end of the ejector while the latter moves forwardly and rearwardly, relatively to the frame of the machine.

Each of the side bars of the ejector is provided at its rear end with a depending hook 17 adapted to bite into the ground and lock the ejector against rearward movement while the frame and teeth are being moved rearwardly.

A structure of this general character is already known, and it operates as follows: The horses, when moving forward, will push the frame and rake teeth to cause the rake teeth to gather the hay from the windrows. As soon as a load has been gathered, the machine is driven to the stacker, and the rake teeth are forced into the stacker. During this time the rear end of the ejector is dragging over the ground. As soon, however, as the rake teeth have been forced into the stacker a sufficient distance, the driver backs the horses, and the hooks at the rear end of the ejector dig into the ground, so that the ejector does not travel rearwardly with the machine. As a result, the rake teeth are moved rearwardly relatively to the ejector, and the head of the ejector will thus function to remove the hay from the rake teeth.

My invention consists in combining with a machine of this character, means for temporarily locking the ejector in its extreme forward position, so that the ejector may be employed for pushing the ejected hay on to the stacker. These means include an elongated loop 20 connected to the underside of the frame at the rear end of the teeth, which encircles the guide rod 12, and functions as a support for the latter. A ring 21 loosely surrounds the rod and is connected to a chain or cable 22 which passes through a hole 23 in one of the teeth and then extends rearwardly to a lever 24, pivotally mounted on the frame, adjacent the driver's seat 25. When the ejector is in its extreme forward position, the driver may manipulate the lever 24 and this will cause the ring 21 to lift the rear end of the ejector, so that stops 26 on the rear end of the ejector may be brought into engagement with one of the front cross bars 4 of the frame, and thus lock the ejector against rearward movement. When the parts are in this position, the machine may be driven forwardly, and thus cause the head of the ejector to force the hay on to the stacker.

From the foregoing, it is believed that the construction, operation and advantages of the invention may be readily understood, and it is apparent that changes may be made in the details disclosed without departing from the spirit of the invention as expressed in the claims.

What is claimed and desired to be secured by Letters Patent is:—

1. A rake comprising a member provided with teeth projecting from the forward end thereof, said member being supported on wheels, a second member slidably engaged with the teeth of the first-named member and means carried by one of said members to engage the other member to interlock same when the second member is in its extreme forward position whereby said members will move forward in unison.

2. A rake comprising a wheel-supported frame, teeth projecting forwardly from said frame, an ejector member slidably connected with said teeth, means carried by said member to engage the ground for holding the member in fixed position while the frame and teeth are moved rearwardly relatively to said member, and means carried by said member to interlock with the frame for holding the member in its extreme forward position.

3. A rake comprising a wheel-supported frame, teeth projecting forwardly from said frame, an ejector carried by the frame and movable relatively to said teeth, said ejector having a head at its forward end and depending ground-engaging hooks at its rear end, whereby when said hooks are engaging the ground, they hold the ejector against rearward movement while the frame and teeth are being moved rearward, and means carried by said ejector to engage the frame whereby the ejector will move forward with the teeth when the ejector is in its forward position.

4. A rake including a wheel supported frame, teeth projecting forwardly from said frame, an ejector carried by the frame and provided at its forward end with an ejector head, said ejector having teeth at its rear end to dig into the ground and lock the ejector against rearward movement, while the frame and teeth are moved rearwardly, and stop means on the ejector engageable with the frame for causing the ejector to move forward with the frame when the ejector is in its extreme forward position.

5. A rake including a wheel supported frame, teeth projecting from the forward end of said frame, an ejector slidably mounted on said teeth and having an ejector head at its forward end, means at the rear end of the ejector to interlock with the ground for holding the ejector in fixed position, while the frame and teeth are moved rearwardly, stops on said ejector to interlock with the frame for holding the ejector in its extreme forward position, a control member mounted on the frame, and means connecting the control member with the ejector for use in moving the stops into and out of operative position.

6. In a rake, a wheel supported frame, teeth projecting forwardly from the frame, an ejector carried by said frame and including side bars and cross bars, an ejector head arranged at the forward end of the ejector, depending hooks arranged at the rear ends of said side bars, means slidably connecting the forward ends of the cross bars to said teeth, a guide rod connected to the cross bars, stops on the rear end portions of the side bars to interlock with the frame for holding the ejector in its extreme forward position, a ring loosely mounted on the guide rod, and means connected to the ring for lifting the rear ends of the side bars to cause the stops to interlock with the frame, whereby the ejector will move forwardly with the frame while the ejector is in its extreme forward position.

7. A rake including a wheel-supported frame, teeth projecting forwardly from said frame, an ejector carried by the frame and provided with an ejector head, means for preventing the ejector from moving rearwardly relatively to the frame while the frame and teeth are moved rearwardly, and stop means on the ejector to interlock with the frame for holding the ejector in its extreme forward position.

8. A rake including a wheel-supported frame, teeth projecting forwardly from said frame, an ejector carried by the frame and provided with an ejector head, depending teeth connected to the ejector to interlock with the ground for holding the ejector in fixed position while the frame and first-mentioned teeth are moved rearwardly relatively to the ejector, and stop means on the ejector to interlock with the frame for holding the ejector in its extreme forward position.

ARTHUR T. GRIFFITH.